(12) United States Patent
Williams (10) Patent No.: US 8,375,297 B2
(45) Date of Patent: Feb. 12, 2013

(54) ORTHOGONAL TRANSFORMATION OF WEB PAGES

(75) Inventor: Murray Todd Williams, New York, NY (US)

(73) Assignee: Accenture Global Services Limited, Dublin (IE)

(*) Notice: Subject to any disclaimer, the term of this patent is extended or adjusted under 35 U.S.C. 154(b) by 178 days.

(21) Appl. No.: 12/858,685

(22) Filed: Aug. 18, 2010

(65) Prior Publication Data

US 2012/0047430 A1 Feb. 23, 2012

(51) Int. Cl.
G06F 17/00 (2006.01)
(52) U.S. Cl. .................. 715/239; 715/234; 715/235
(58) Field of Classification Search .................. 715/273, 715/239; 705/3, 14.42
See application file for complete search history.

(56) References Cited

U.S. PATENT DOCUMENTS

| | | | |
|---|---|---|---|
| 2004/0249487 A1* | 12/2004 | Ahlert et al. | 700/83 |
| 2006/0162071 A1* | 7/2006 | Dixon et al. | 5/93.1 |
| 2010/0250714 A1* | 9/2010 | Wehmann et al. | 709/220 |
| 2011/0153413 A1* | 6/2011 | Chunilal | 705/14.42 |

* cited by examiner

Primary Examiner — Cesar Paula
Assistant Examiner — Quoc A Tran
(74) Attorney, Agent, or Firm — Mannava & Kang, P.C.

(57) ABSTRACT

A multivariate web page testing system includes a content retrieval module configured to receive a web page request from a visitor's browser and determine corresponding HTML content corresponding to the web page in the web page request. The multivariate web page testing system further includes a content determination module configured to determine if the corresponding HTML content conforms to a preset standard. An adapter is configured to convert the corresponding HTML content to conform to the preset standard if the corresponding HTML content does not conform to the preset standard. The multivariate web page testing system further includes an experimental treatment determination module configured to determine an experimental treatment for the corresponding HTML content and an experimental treatment application module configured to apply the treatment to the corresponding HTML content to create orthogonally transformed HTML content. The orthogonally transformed HTML content is operable to be transmitted to the visitor's browser.

17 Claims, 4 Drawing Sheets

ORTHOGONAL TRANSFORMATION OF WEB PAGES

BACKGROUND

Vendors seeking to improve sales of their products and/or services have recently turned to developing various online marketing strategies with the advent of the Internet. Online marketing strategies may include various methods of increasing online sales including paid for search, banner ads, search engine optimization, etc. One measure of online marketing success is conversion rate, which is a ratio of visitors to a web site who convert web site visits into desired actions based on content from marketers, advertisers, and content creators. The desired actions may be different according to marketers, advertisers, and content creators. To online retailers, for example, the desired action may include the sale of a product to a consumer whose interest in the item was sparked by clicking on an advertisement. To content creators, however, the desired action may include a membership registration upon visiting a web page.

Vendors may use various strategies to configure their web sites to increase the conversion rate for their products and/or services. One strategy includes altering the configuration of elements on a web page. For example, an element may be an image, a slogan, an ad, text etc. The element may be switched with a different element to determine which configuration of elements on the web page increases the conversion rate.

In order to test various web page configurations to determine how the different web page configurations affect customer behavior, i.e. the conversion rate, a vendor may test two web page configurations against one another. For example, one web page configuration may include ad A and one web page configuration may include ad B. Each web page configuration may be tested on consumers to determine which of the web pages results in a higher conversion rate. However, testing individual alterations to a web page configuration is inefficient.

To avoid this inefficiency, vendors may conduct multivariate testing. Multivariate testing enables a vendor to test multiple alterations to a web page, or multiple variations of the web page, at once, while determining an individual effect of each element on user behavior. Therefore, a conversion rate may be determined for each element of the web page being tested.

To conduct multivariate testing, a plurality of regions of a web page are identified. The vendors may surround each of the plurality of regions with tags that replace content, or the element, in the region. However, identifying and replacing elements in various regions of a web page often involves complex and invasive code being placed inside the web page or being combined with web page generation logic. Moreover, confounding logic with other possibly unrelated web logic may cause negative side effects and decrease maintainability. Also, if changes to two different regions of a web page have any degree of overlap where the changes effect the same element of the web page, the interactions can cause negative side effects and it is difficult to determine an individual effect of each element of a web page on user behavior.

SUMMARY OF THE INVENTION

A multivariate web page testing system includes a content retrieval module configured to receive a web page request from a visitor's browser and determine corresponding HTML content corresponding to the web page in the web page request. The multivariate web page testing system further includes a content determination module configured to determine if the corresponding HTML content conforms to a preset standard. An adapter is configured to convert the corresponding HTML content to conform to the preset standard if the corresponding HTML content does not conform to the preset standard. The multivariate web page testing system further includes an experimental treatment determination module configured to determine an experimental treatment for the corresponding HTML content and an experimental treatment application module configured to apply the treatment to the corresponding HTML content to create orthogonally transformed HTML content. The orthogonally transformed HTML content is operable to be transmitted to the visitor's browser.

According to an embodiment, a method performs an orthogonal transformation of a web page The method comprises receiving a web page request from the visitor's browser and determining corresponding HTML content corresponding to the web page in the web page request. The method further comprises determining if the corresponding HTML content conforms to a preset standard and converting the corresponding HTML content to conform to the preset standard if the corresponding HTML content does not conform to the preset standard and determining an experimental treatment for the corresponding HTML content. The method also comprises applying the experimental treatment to the corresponding HTML content to create orthogonally transformed HTML content and transmitting the orthogonally transformed HTML content to the visitor's browser. The method may be performed by a computer system executing computer readable instructions provided on a non-transitory computer readable medium.

BRIEF DESCRIPTION OF DRAWINGS

The embodiments of the invention will be described in detail in the following description with reference to the following figures.

DETAILED DESCRIPTION OF EMBODIMENTS

For simplicity and illustrative purposes, the principles of the embodiments are described by referring mainly to examples thereof. Also, the embodiments may be used in combination with each other. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments. Also, the embodiments described herein may be used with each other in various combinations.

1. Overview

According to an embodiment, a multivariate web page testing system is operable to perform multivariate testing experiments on web pages. A multivariate testing experiment may include assigning an experimental treatment to each visitor to a web page. An experimental treatment is a particular assignment of levels of attributes in the multivariate testing experiment. A level is one possible setting for an attribute. An attribute is a single variable in the experimental treatment. Examples of attributes may include a position of a button, a style of font, a size of font, etc. An attribute may also represent an entire color palette of a web page, or just the color of all buttons on the web page.

In an example, the multivariate testing experiment may include the following four attributes (I) "Header Text", (II) "Button Text", (III) "Button Color" and (IV) "Form Tooltips". The "Header Text" attribute includes two possible levels: (i) "Shopping Cart" or (ii) "Ordering System". The "Button Text" attribute includes three possible levels: (i) "Buy Now", (ii) "Buy" or (iii) "Purchase". The "Button Color" includes two possible levels: (i) "Red" or (ii) "Green". The "Form Tool-tips" attribute includes three possible levels: (i) "Old", (ii) "New Variation" or (iii) "Off". An example of a particular assignment of the levels of the attributes for a visitor to the web page, i.e. an example of an experimental treatment, may be "Shopping Cart", "Purchase", "Red" and "Off". Another example of another treatment for another visitor to the same web page may be "Ordering System", "Buy", "Red" and "New Variation".

An element may be an atomic component of a web page. For example, an element may be an introductory paragraph, a table, a button, etc. on the web page. An experimental treatment that sets attribute levels may affect a single element of the web page. For example, the experimental treatment may affect a button attribute on the web page. The experimental treatment may also affect overlapping elements of the web page. For example, the experimental treatment may affect a sidebar attribute on the web page and affect a button attribute in the sidebar of the web page. Though physically the elements of the web page affected by the experimental treatment may overlap, e.g. the button is in the sidebar of the webpage therefore the button element physically overlaps with the sidebar element, each overlapping element may be associated with two different attributes that may be varied independently, and the variation of the attributes are an orthogonal transformation. That is, possible variations of one attribute are not altered or limited by a selected variation of a second attribute. For example, if one attribute is a background color of a button and a second attribute is text on the button, all combinations of these two attributes are possible.

Multiple attributes of multiple elements of the web page may be varied or altered to determine an optimal configuration of the web page. The multivariate web page testing system may perform a series of alterations to the web page based on the assigning a level of each attribute in an experimental treatment. Thus, the multivariate web page testing system performs an orthogonal transformation of the web page, i.e. the series of independent, non-conflicting alterations for each visitor to the web page.

Actions are used to perform the series of alterations, i.e. to set levels of attributes in an experimental treatment to the web page. An action is a single, atomic change made to a web page. Setting a level of an attribute may comprise performing several actions. For example, a "Button Style" attribute has two possible levels: (i) "Old" or (ii) "New". If the "New" level is selected as the setting for the "Button Style" attribute, a series of actions are performed for the web page to manifest the "New" level setting. For example, the (1) the background color of the button may be set to pale blue, (2) the border color of the button may be set to dark blue, (3) a small iconic symbol may be appear to the right of the button text, (4) the button text font may be changed to "Arial", (5) a shadow may be added to the button and (6) a JAVASCRIPT function that causes the button to wiggle once every 30 seconds may be run.

The multivariate web page testing system may also perform visitor tracking on the web page to determine the overall affect of the orthogonal transformation on visitor behavior, while determining an individual affect of each variation on visitor behavior. Therefore, a conversion rate, i.e. a measure of visitor behavior, may be determined for each variation of the web page.

The multivariate web page testing system promotes clean design practices that reduce IT burden, safeguards against toolkit interaction defects, and creates a multivariate testing experimental framework that creates an extremely flexible page transformation framework. The multivariate web page testing system enables multiple disparate web page alternations to be simultaneously deployed without negative interaction.

2. System

Figure 1:
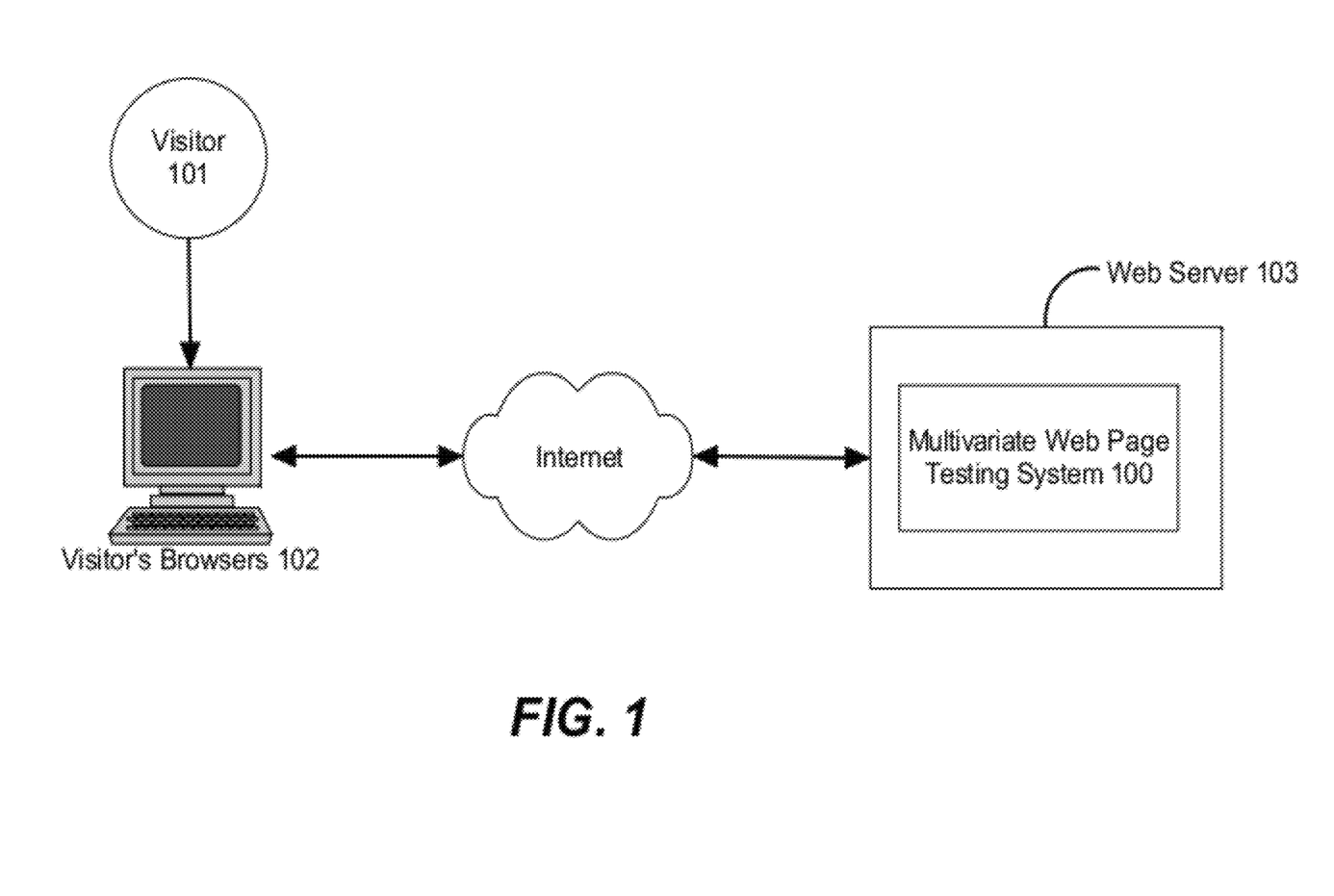
FIG. 1 illustrates a system diagram for a multivariate web page testing system, according to an embodiment.

FIG. 1 illustrates a high-level diagram of a multivariate web page testing system 100, according to an embodiment. A visitor, such as visitor 101, requests a web page to be rendered on a visitor's browser 102. The visitor's browser 102 contacts a web server 103 hosting the requested web page via a network, such as the Internet, to retrieve the requested web page for the visitor 101. The web server 103 may include the multivariate web page testing system 100. The multivariate web page testing system 100 returns HTML content from the web server 103 to the visitor's browser 102 that has been orthogonally transformed. The HTML content may be HyperText Markup Language (HTML) used to encode web pages. The orthogonally transformed HTML content is rendered in the visitor's browser 102 for the visitor 101.

Figure 2:
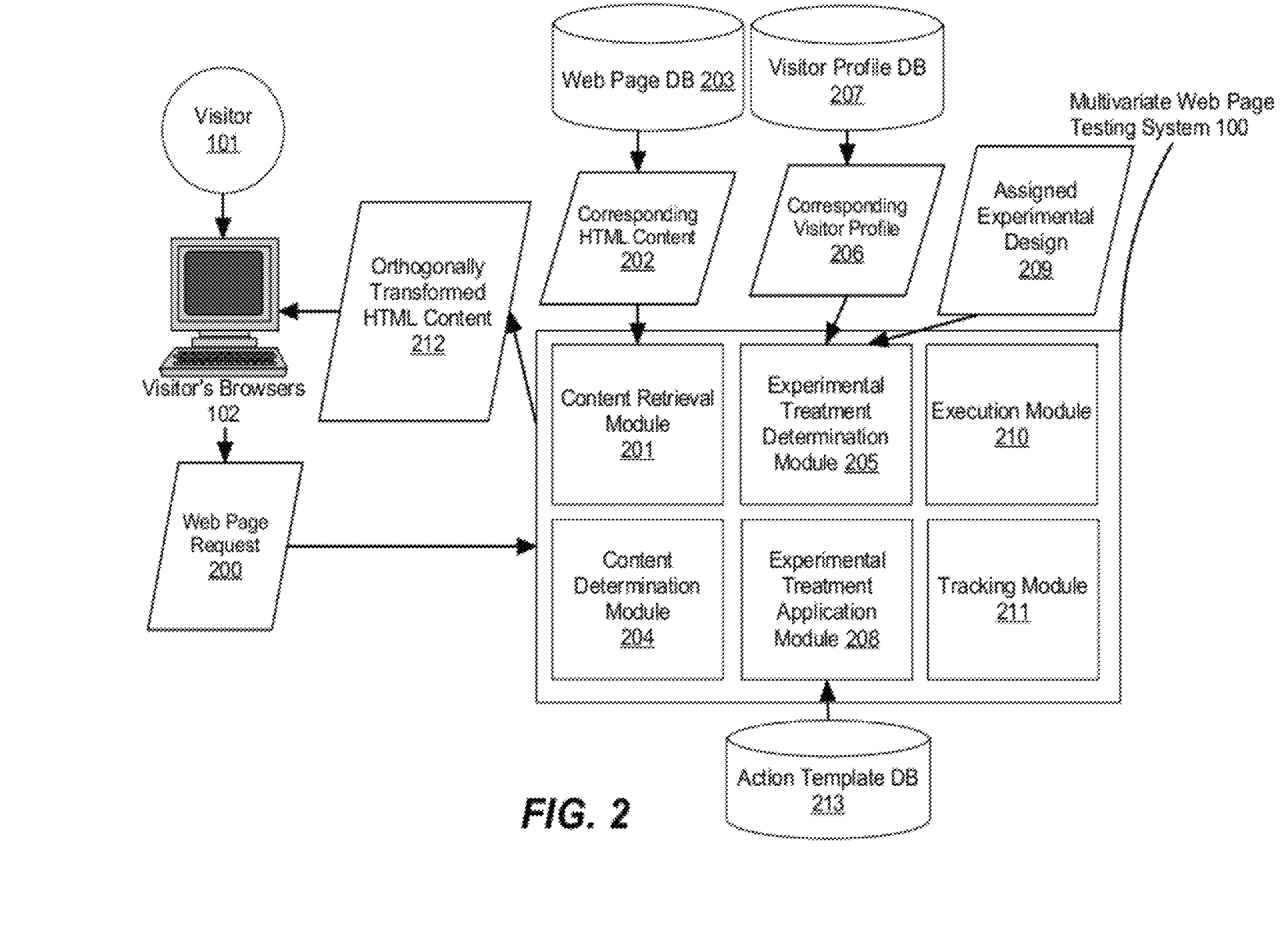
FIG. 2 illustrates an additional system diagram for a multivariate web page testing system, according to an embodiment.

FIG. 2 illustrates the multivariate web page testing system 100 in more detail. The multivariate web page testing system 100 includes a content retrieval module 201, a content determination module 204, an experimental treatment determination module 205, an experimental treatment application module 208, an execution module 210 and a tracking module 211.

As discussed above, and now as shown in FIG. 2, the multivariate web page testing system 100 receives a web page request 200 from the visitor's browser 102 of the visitor 101. The web page request 200 may be a request for a web page to be rendered in the visitor's browser 102. The content retrieval module 201, upon receipt of the web page request 200, may retrieve a corresponding HTML content 202 from a web page database (DB) 203. The web page DB 203 may be internal or external to the multivariate web page testing system 100. The corresponding HTML content 202 may be HTML content stored in the web page DB 203 that corresponds to the web page requested in the web page request 200. Thus, the corresponding HTML content 202 is an encoding of the web page requested in HTML or XHTML (another form of HTML). The corresponding HTML content 202 may also be stored in a file system or may be content dynamically generated by an application.

The content determination module 204 determines if the corresponding HTML content 202 retrieved from the web page DB 203 is in a proper format. Whether the corresponding HTML content 202 is in the proper format may be determined by the content determination model 204 by parsing the corresponding HTML content 202 to ensure the corresponding HTML content 202 conforms to preset standards. For example, it may be preset in the content determination module 204 that the corresponding HTML content 202 conform to HTML standards or XHTML standards. If the corresponding HTML content 202 is not in the proper format, i.e. the corresponding HTML content 202 does not conform to the preset standard, as determined by parsing the corresponding HTML content 202, the content determination module 204 employs an adapter (not shown) to convert the corresponding HTML content 202 to the proper format. The adapter may include a cleaning adapter that autocorrects improper or malformed HTML. The adapter may be configured to run when the corresponding HTML content 202 is known not to configure to the preset standards.

Once the corresponding HTML content 202 is in the proper format, the experimental treatment determination module 205 determines if the visitor 101 is a new visitor to the web page. The visitor 101 is a new visitor to the web page, for example, if a corresponding visitor profile 206 is not retrieved from a visitor profile database (DB) 207. The visitor profile DB 207 may be internal or external to the multivariate web page testing system 100 and stores a corresponding visitor profile 206 for each visitor that has previously visited the web page. Thus, if a corresponding visitor profile 206 is not stored in the visitor profile DB 207 for the visitor 101, the visitor 101 is considered a new visitor. However, if a corresponding visitor profile 206 is retrieved from the visitor profile DB 207 for the visitor 101, the visitor 101 has previously visited the web page.

The corresponding visitor profile 206 for each visitor that has previously visited the web page, such as visitor 101, may include an experimental treatment previously applied to the web page requested by the visitor 101 when the visitor 101 last visited the web page. As discussed above, an experimental treatment is a particular assignment of levels of attributes in the multivariate testing experiment. A level is one possible setting for an attribute. An attribute is a single variable in the experimental treatment. Therefore, the experimental treatment previously applied to the web page requested by the visitor 101 includes attributes varied and assigned levels of the varied attributes applied when the visitor 101 last visited the web page.

If, however, no corresponding visitor profile 206 is retrieved from the visitor profile DB 207 for the visitor 101, the experimental treatment determination module 205 determines an experimental treatment to apply to the web page requested by the visitor 101 based on an assigned experimental design 209. The assigned experimental design 209 is a set of all of the possible experimental treatments. The assigned experimental design 209 may be retrieved from an external or internal source. The experimental treatment determination module 205 randomly selects and assigns an experimental treatment for the visitor 101 from the set of all of the possible experimental treatments included in the assigned experimental design 209. Thus, whether the visitor 101 is a new visitor or a visitor that has previously visited the web page, an experimental treatment is assigned to the web page requested by the visitor 101.

The experimental treatment application module 208 applies the experimental treatment determined by the experimental treatment determination module 205 to the corresponding HTML content 202 corresponding to the web page requested by the visitor 101. The experimental treatment, as discussed above, is a particular assignment of levels of attributes. To apply the determined experimental treatment to the corresponding HTML content 202, the experimental treatment application module 208 may generate one or more orthogonal actions for each attribute for which a level has been assigned in the experimental treatment. As discussed above, an action is a single, atomic change made to a web page. An action may alter the encoding in the corresponding HTML content 202 to effect the change to the web page.

The experimental treatment application module 208 may generate the one or more actions for each attribute included in the experimental treatment. In the example described above, the "Button Style" attribute has two possible levels: (i) "Old" or (ii) "New". If the "New" level is selected as the setting for the "Button Style" attribute, a series of actions are performed to alter the corresponding HTML content 202 for the web page to manifest the selected level, i.e. the "New" level. The actions may include (1) set the background color of the button to pale blue, (2) set the border color of the button to dark blue, (3) insert a small iconic symbol to the right of the button text, (4) change the button text font to "Arial", (5) add a shadow to the button and (6) run a JAVASCRIPT function that causes the button to wiggle once every 30 seconds.

Each of these actions may be generated by the experimental treatment application module 208 based on an action template, a selector and level settings. An action template describes what the action will accomplish or perform in relation to the attribute for which the action is being generated. In the example described above, one action included in setting the level of the "Button Style" attribute to "New" is "set the background color of the button to pale blue". Thus, the action template describes changing the background color of the button to pale blue. Other examples of action templates may include setting a cascade style sheet (CSS) rule to an element, adding a global CSS fragment to the entire web page, adding/changing a text node, running a JAVASCRIPT fragment, etc. An action template may be retrieved from an action template database (DB) 213, which may be internal or external to the multivariate web page testing system 100. Actions templates are stored for common functions a computer may perform, such as changing color, changing text, etc. Actions may, instead of acting on the corresponding HTML directly, act on an internal or external system that generates the corresponding HTML content 202. Actions may be generated that interact with the web server 103 or external databases or other enterprise services where the actions function to retrieve alternative content and apply the alternative content to a web page.

The experimental treatment application module 208 may determine a selector for the action. The selector describes a target element of the web page upon which the action template will act. In this example, the target element is a button. The selector for the action may be an XPath statement identifying the button.

Level settings describes a setting based on the level assigned for the attribute to which the action is related based on the particular assignment of levels for attributes in the randomly assigned experimental treatment. In one example, a level setting may be "background:pale blue" for the "New" level of the "Button Style" attribute. The combination of the action template, the selector and the level setting comprise one single, orthogonal action.

The execution module 210 executes the one or more actions as a series. The execution of the each of the individual actions orthogonally transforms the corresponding HTML content 202. The orthogonal transformation of the corresponding HTML content 202 is the performance of the series of alterations based on assigning the levels of the attributes being varied. The series of alterations alters the corresponding HTML content 202, i.e. the encoding of the web page, based on the actions. The altered encoding is an orthogonally transformed HTML content 212, which is then returned to the visitor's browser 202 to be rendered. The orthogonally transformed HTML content 212 may be delivered along with the original corresponding HTML content 202 to the visitor's browser 102, and an orthogonal transformation may be performed at the visitor's browser 102 before the requested web page is displayed to the visitor 101a.

The tracking module 211 tracks visitor behavior at the visitor's browser 102 in response to rendering the orthogonally transformed HTML content 212. The tracking module 211 performs multivariate testing analysis on the tracking data to determine an overall affect of the orthogonal transformation on visitor behavior, while determining an individual affect of each variation on visitor behavior. Therefore, a conversion rate, i.e. a measure of visitor behavior, may be determined for each variation of the web page.

3. XSLT Implementation

Web pages may be encoded in HyperText Markup Language (HTML) or Extensible HyperText Markup Language (XHTML). HTML is a standard markup language maintained by World Wide Web Consortium (W3C). A markup language is a set of markup tags to describe the layout of a webpage. Thus, HTML allows the creation of structured documents, such as web pages, using structural semantics, such as tags. XHTML is an extended version of HTML and also a standard markup language maintained by the W3C. XHTML is HTML defined as an XML application or document. Thus, documents encoded in HTML that is XHTML-compliant and XHTML documents are XML documents. Therefore, XSLT may be used to alter web pages encoded as HTML documents that are XHTML-compliant and XHTML documents.

The multivariate web page testing system 100 described above may perform the orthogonal transformation of the web page using Extensible Stylesheet Language Transformations (XSLT). XSLT was developed by the W3C and is an XML-based language used to transform XML documents into other XML documents. However, the original XML document is not changed. Instead, a new XML document is created based on the content of the original XML document.

In one embodiment, the experimental treatment application module 208 creates actions in the form of XSLT fragments, and the execution module 210 executes the XSLT fragments on a web page, as described below.

As discussed above, the multivariate web page testing system 100 receives the web page request 200 from the visitor's browser 102 of the visitor 101, as discussed above. The content retrieval module 201, upon receipt of the web page request 200, may retrieve the corresponding HTML content 202 from the web page DB 203. The content determination module 204 determines if the corresponding HTML content 202 retrieved from the web page DB 203 conforms to XHTML standards, i.e. ensures the corresponding HTML content 202 is an XML document. If the corresponding HTML content 202 is not in the proper format as determined by parsing the corresponding HTML content 202, the content determination module 204 employs a parser (not shown) to convert the corresponding HTML content 202 to XHTML content, i.e. an XML document. Once the corresponding HTML content 202 is determined to be an XML document, the experimental treatment determination module 205 determines an experimental treatment to be applied, as discussed above.

The experimental treatment application module 208 applies the experimental treatment determined by the experimental treatment determination module 205 to the corresponding HTML content 202 corresponding to the web page requested by the visitor 101. To apply the experimental treatment to the corresponding HTML content 202, the experimental treatment application module 208 generates an XSLT fragment, i.e. an action. The XSLT fragment is generated as the action as discussed above, except the XSLT fragment is encoded in XSLT and is an XML document. The one or more XSLT fragments generated by the experimental treatment application module 208 form an XSLT document.

The execution module 210 executes the XSLT document. The execution of the XSLT document orthogonally transforms the corresponding HTML content 202, encoded in XHTML or XHTML-compliant HTML, into the orthogonally transformed HTML content 212, which is then returned to the visitor's browser 202 to be rendered.

4. Other Implementations

In another embodiment, basic XML processing may be utilized to orthogonally transform a web page. A requested web page may be read as an XML document. Each action is represented as an algorithm written in a programming language that applies one or more actions to the XML document. After all of the actions have been applied, the transformed XML document is encoded into a transformed XHTML or HTML source document.

One method of implementing this embodiment is using DOM processing. The requested web page may be loaded and converted into a DOM representation. Each algorithm is then applied in sequence to the DOM representation. The transformed DOM document is then encoded in XHTML and transmitted to the visitor's browser.

Another method of implementing this embodiment is using stream processing. In Java, this is SAX processing. A stream processor is a mechanism that converts a stream of data, i.e. the corresponding HTML content, as it passes through the stream processor. A series of stream processors may be chained so that the series of stream processors form a long tunnel. Therefore, the untransformed data stream, i.e. the corresponding HTML content, enters the tunnel and the completely transformed stream, i.e. the orthogonally transformed HTML content, leaves the tunnel.

In another embodiment, a search-and-replace routine may be utilized to orthogonally transform the corresponding HTML content. The search-and-replace routine is non-XML-specific such that the search-and-replace routine does not require that the requested web page, i.e. the corresponding HTML content, be an XML document. Instead, the search-and-replace routine finds parts of the HTML document that need to be altered. For example, opening- and closing-HTML tags are counted to determine where in the document the orthogonal changes are to be made. Thus, the source document does not require conversion to XHTML.

In yet another embodiment, tunneled JAVASCRIPT and stylesheets may be utilized to effect an orthogonal transformation on a web page. The web page, i.e. the XML document, may be transformed by inserting one <style> element into the <head> section of the XML document and two JAVASCRIPT <script> elements, one at the bottom of the <head> section and a second one at the bottom of the <body> section. All of the actions are converted into fragments of JAVASCRIPT or CSS that are inserted into one of these new elements to transform the XML document after the XML document has been sent to the web browser 103 but before the web page has been rendered and displayed to the visitor 101a.

These methods may also be combined to orthogonally transform a web page. For example, some alterations may be performed via the search-and-replace routine and other more difficult alterations may be performed via the tunneled JAVASCRIPT/CSS strategy. Moreover, the multivariate web page testing system 100 may dynamically switch between the different strategies to achieve the best results for a particular web page.

5. Method

Figure 3:
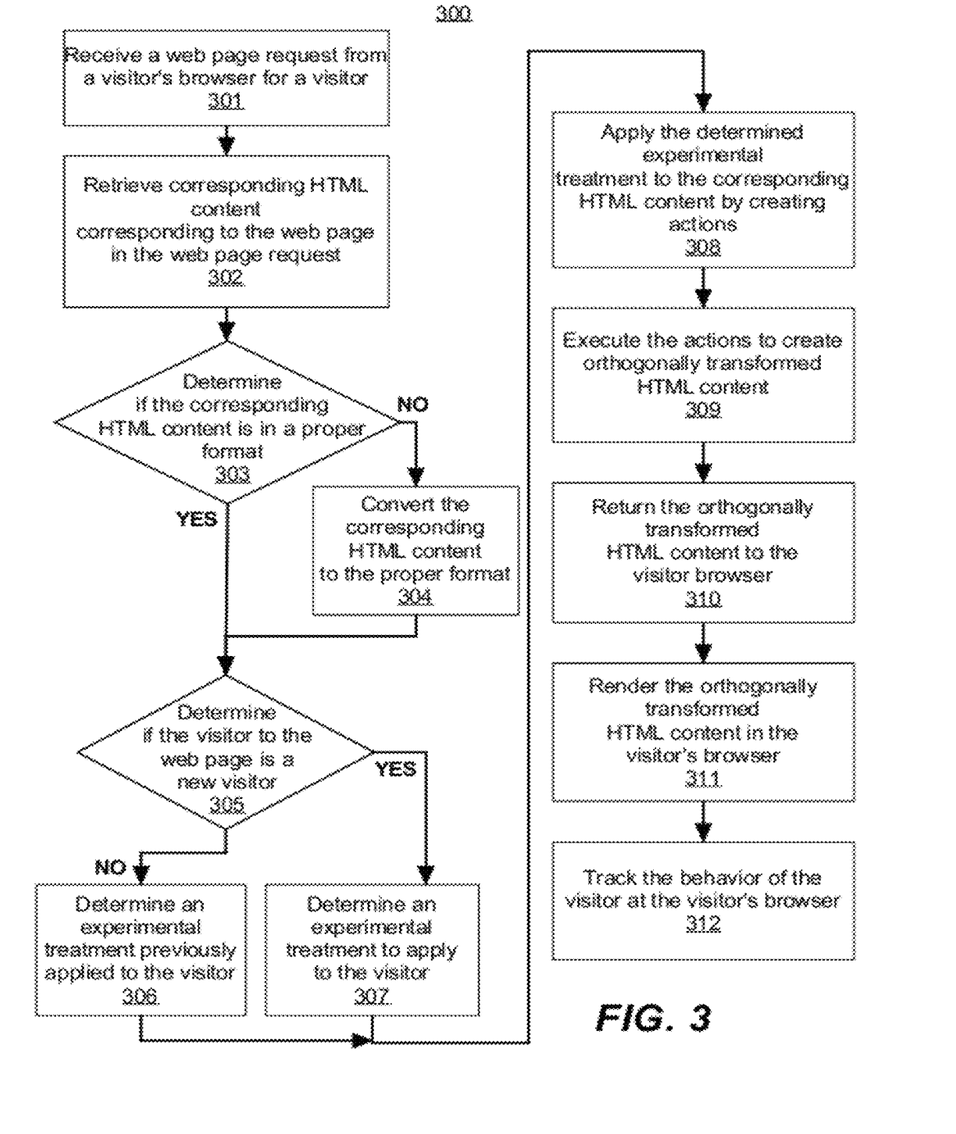
FIG. 3 illustrates a method for performing an orthogonal transformation of a web page, according to an embodiment.

FIG. 3 illustrates shows a flowchart of a method 300 for performing an orthogonal transformation of a web page, according to an embodiment. The method 300 may be implemented on the multivariate web page testing system 100 described above referring to FIGS. 1 and 2 by way of example and not limitation. The method 300 may be practiced in other systems.

At step 301, the multivariate web page testing system 100 receives a web page request from a visitor's browser. The web page request may be a request for a web page to be rendered in the visitor's browser.

At step 302, upon receipt of the web page request, the multivariate web page testing system 100 may retrieve corresponding HTML content from a web page database. The corresponding HTML content may be HTML content stored in the web page database that corresponds to the web page requested in the web page request. The corresponding HTML content is an encoding of the web page requested in HTML or XHTML.

At step 303, the multivariate web page testing system 100 determines if the corresponding HTML content retrieved from the web page database is in a proper format by parsing the corresponding HTML content to ensure the corresponding HTML content conforms to preset standards. For example, it may be preset in the multivariate web page testing system 100 that the corresponding HTML content conforms to HTML standards or XHTML standards. If the corresponding HTML content is in the proper format, the process moves onto step 305.

If the corresponding HTML content 202 is not in the proper format, i.e. the corresponding HTML content 202 does not conform to the preset standard, the process proceeds to step 304. At step 304, the multivariate web page testing system 100 employs a parser (not shown) to convert the corresponding HTML content to the present standard, i.e. the proper format. The process then proceeds to step 305.

At step 305, once the corresponding HTML content conforms to the preset standard, the multivariate web page testing system 100 determines if the visitor is a new visitor to the web page. The visitor may be determined to be a new visitor to the web page if a corresponding visitor profile is not identifiable from a visitor profile database. The visitor profile database stores a corresponding visitor profile for each visitor that has previously visited the web page. Thus, if a corresponding visitor profile is not retrieved from the visitor profile database for the visitor, the visitor is a new visitor and the process proceeds to step 307. However, if a corresponding visitor profile is retrieved from the visitor profile database for the visitor, the visitor is determined to have previously visited the web page and the process proceeds to step 306.

At step 306, an experimental treatment to be applied to the web page requested by the visitor that has previously visited the web page is determined. The corresponding visitor profile for each visitor that has previously visited the web page may include an experimental treatment previously applied to the web page requested by the visitor when the visitor last visited the web page. As discussed above, an experimental treatment is a particular assignment of levels of attributes in the multivariate testing experiment. The experimental treatment previously applied to the web page requested by the visitor includes attributes varied and assigned levels of the varied attributes applied when the visitor last visited the web page. The process proceeds to step 308.

At step 307, if, however, no corresponding visitor profile is retrieved from the visitor profile database for the visitor, the multivariate web page testing system 100 determines an experimental treatment to apply to the web page requested by the visitor based on an assigned experimental design. The assigned experimental design is a set of all of the possible experimental treatments. The multivariate web page testing system 100 randomly selects and assigns an experimental treatment for the visitor from the set of all of the possible experimental treatments included in the assigned experimental design. The process proceeds to step 308.

At step 308, the multivariate web page testing system 100 applies the experimental treatment determined at either step 306 or 307 to the corresponding HTML content corresponding to the web page requested by the visitor. The experimental treatment, as discussed above, is a particular assignment of levels of attributes included in the experimental treatment. To apply the determined experimental treatment to the corresponding HTML content, the multivariate web page testing system 100 may generate one or more orthogonal actions for each attribute for which a level has been assigned in the experimental treatment. Each of these actions may be generated by the multivariate web page testing system 100 based on an action template, a selector and level settings, as discussed above.

At step 309, the multivariate web page testing system 100 executes each action individually on the corresponding HTML content from step 303 or 304. The execution of all of the actions orthogonally transforms the corresponding HTML content. The orthogonal transformation of the corresponding HTML content is the performance of the series of alterations based on assigning the levels of the attributes being varied. The series of alterations alters the corresponding HTML content, i.e. the encoding of the web page, based on the levels of the attributes being varied. The altered encoding is an orthogonally transformed HTML content.

At step 310, the multivariate web page testing system 100 returns the orthogonally transformed HTML content to the visitor's browser to be rendered in the visitor's browser.

At step 311, the returned orthogonally transformed HTML content is rendered in the visitor's browser for the visitor.

At step 312, the multivariate web page testing system 100 tracks visitor behavior at the visitor's browser in response to rendering the orthogonally transformed HTML content. The multivariate web page testing system 100 performs multivariate testing analysis on the tracking data to determine an overall affect of the orthogonal transformation on visitor behavior, while determining an individual affect of each variation on visitor behavior. Therefore, a conversion rate, i.e. a measure of visitor behavior, may be determined for each variation of the web page.

5. Computer System

Figure 4:
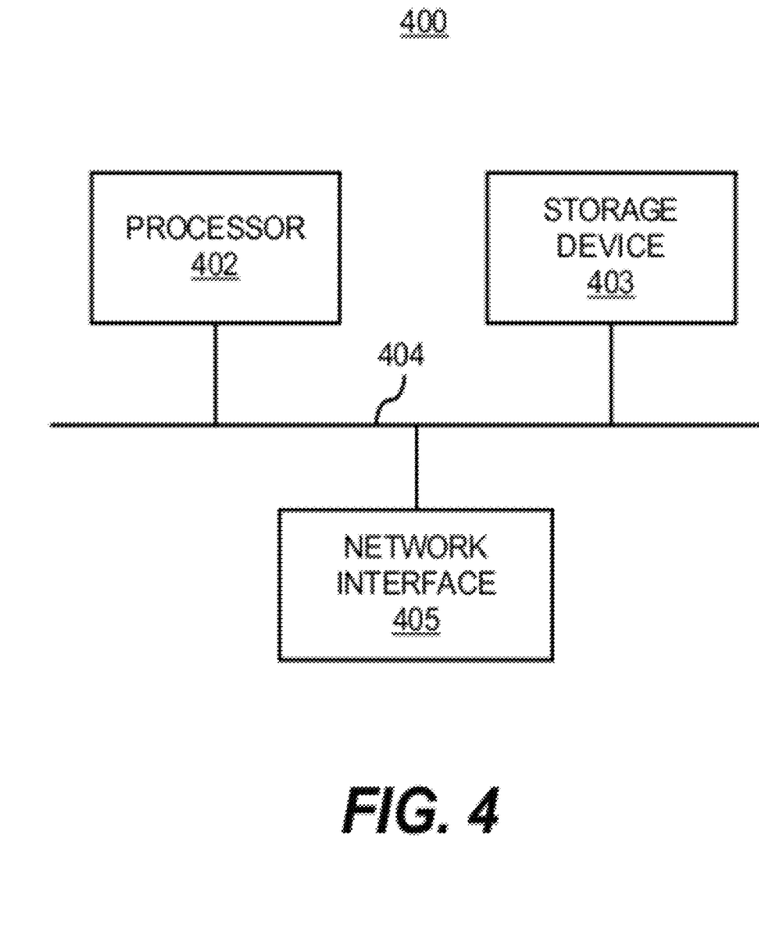
FIG. 4 illustrates a computer system, according to an embodiment.

FIG. 4 shows a computer system 400 that may be used as a hardware platform for the multivariate web page testing system 100. The computer system 400 may be used as a platform for executing one or more of the steps, methods, modules and functions described herein that may be embodied as software stored on one or more computer readable mediums. The computer readable mediums may be non-transitory, such as storage devices including hardware.

The computer system 400 includes a processor 402 or processing circuitry that may implement or execute software instructions performing some or all of the methods, modules, functions and other steps described herein. Commands and data from the processor 402 are communicated over a communication bus 404. The computer system 400 also includes a computer readable storage device 403, such as random access memory (RAM), where the software and data for processor 402 may reside during runtime. The storage device 403 may also include non-volatile data storage. The computer system 400 may include a network interface 405 for connecting to a network. It will be apparent to one of ordinary skill in the art that other known electronic components may be added or substituted in the computer system 400.

While the embodiments have been described with reference to examples, those skilled in the art will be able to make various modifications to the described embodiments without departing from the scope of the claimed embodiments. Also, the embodiments are generally described with respect to orthogonally transforming web pages. However, the embodiments are also applicable to transforming any type of XML document and performing multivariate testing on any type of orthogonally transformed XML document.

What is claimed is:

1. A multivariate web page testing system comprising:
   a content retrieval module to receive a web page request from a visitor's browser and determine corresponding HTML content corresponding to a web page for the web page request;
   a content determination module to determine if the corresponding HTML content conforms to a preset standard, wherein an adapter is to convert the corresponding HTML content to conform to the preset standard if the corresponding HTML content does not conform to the preset standard;
   an experimental treatment determination module to determine an experimental treatment for the corresponding HTML content, wherein the experimental treatment comprises a series of actions to alter attribute levels of elements in the web page, and
   an attribute level of the attribute levels comprises one possible setting for an attribute of one of the elements; and
   the elements include Header Text, Button Text, Button Color, and Form Tool-tips; and
   an experimental treatment application module executed by a hardware processor to apply the experimental treatment to the corresponding HTML content to create orthogonally transformed HTML content, wherein the orthogonally transformed HTML content is operable to be transmitted to the visitor's browser, and
   applying the experimental treatment to the corresponding HTML content includes identifying stored actions, each stored action corresponding to an action of the series of actions, and
   executing the stored actions to create the orthogonally transformed HTML content.

2. The multivariate web page testing system of claim 1, wherein the preset standard is XHTML.

3. The multivariate web page testing system of claim 1, wherein each of the stored actions comprises an action template, a selector and a level setting.

4. The multivariate web page testing system of claim 1, wherein implementation strategies implemented in the actions include at least of one of XSLT, DOM, SAX, search-and-replace and tunneled script.

5. The multivariate web page testing system of claim 1, wherein the stored actions interact with one of a web server, external database or other enterprise service to retrieve alternative content and apply the alternative content to the corresponding HTML content.

6. The multivariate web page testing system of claim 1, comprising:
   a content determination module configured to determine if the corresponding HTML content conforms to a preset syntax, and is configured to convert the corresponding HTML content to conform to the preset syntax if the corresponding HTML content does not conform to the preset syntax, wherein the converted HTML content comprises HTML content in the preset syntax.

7. A method for performing an orthogonal transformation of a web page, the method comprising:
   receiving a web page request from a visitor's browser;
   determining corresponding HTML content corresponding to the web page in the web page request;
   determining if the corresponding HTML content conforms to a preset standard and converting the corresponding HTML content to conform to the preset standard if the corresponding HTML content does not conform to the preset standard;
   determining, by a computer system, an experimental treatment for the corresponding HTML content, wherein the experimental treatment comprises a series of actions to alter attribute levels of elements in the web page, and
   an attribute level of the attribute levels comprises one possible setting for an attribute of one of the elements, and
   the elements include Header Text, Button Text, Button Color, and Form Tool-tips;
   applying the experimental treatment to the corresponding HTML content to create orthogonally transformed HTML content, wherein applying the experimental treatment to the corresponding HTML content includes identifying stored actions, each stored action corresponding to an action of the series of actions, and
   executing the stored actions to create the orthogonally transformed HTML content; and
   transmitting the orthogonally transformed HTML content to the visitor's browser.

8. The method of claim 7, wherein the preset standard is XHTML.

9. The method of claim 7, wherein each of the stored actions comprises an action template, a selector and a level setting.

10. The method of claim 7, wherein implementation strategies implemented in the actions include at least of one of XSLT, DOM, SAX, search-and-replace and tunneled script.

11. The method of claim 7, further comprising tracking visitor behavior in response to rendering the orthogonally transformed HTML content in the visitor's browser.

12. The method of claim 7, comprising:
   determining if the corresponding HTML content conforms to a preset syntax; and
   converting the corresponding HTML content to conform to the preset syntax if the corresponding HTML content does not conform to the preset syntax, wherein the converted HTML content comprises HTML content in the preset syntax.

13. A non-transitory computer readable medium having stored thereon a computer executable program for performing an orthogonal transformation of a web page, the computer executable program when executed causes a hardware processor to:
   receive a web page request from the visitor's browser;
   determine corresponding HTML content corresponding to the web page in the web page request;
   determine if the corresponding HTML content conforms to a preset standard and convert the corresponding HTML content to conform to the preset standard if the corresponding HTML content does not conform to the preset standard;
   determine an experimental treatment for the corresponding HTML content, wherein the experimental treatment comprises a series of actions to alter attribute levels of elements in the web page, and an attribute level of the attribute levels comprises one possible setting for an attribute of one of the elements, and the elements include Header Text, Button Text, Button Color, and Form Tool-tips;

apply the experimental treatment to the corresponding HTML content to create orthogonally transformed HTML content, wherein applying the experimental treatment to the corresponding HTML content includes identifying stored actions, each stored action corresponding to an action of the series of actions, and executing the stored actions to create the orthogonally transformed HTML content; and transmit the orthogonally transformed HTML content to the visitor's browser.

14. The computer readable medium of claim 13, wherein the preset standard is XHTML.

15. The computer readable medium of claim 13, wherein each of the stored actions comprises an action template, a selector and a level setting.

16. The computer readable medium of claim 13, wherein the computer executable program when executed further causes the hardware processor to track visitor behavior in response to rendering the orthogonally transformed HTML content in the visitor's browser.

17. The computer readable medium of claim 13, wherein the computer executable program when executed further causes the hardware processor to:

determine if the corresponding HTML content conforms to a preset syntax; and convert the corresponding HTML content to conform to the preset syntax if the corresponding HTML content does not conform to the preset syntax, wherein the converted HTML content comprises HTML content in the preset syntax.

* * * * *